(No Model.)
J. V. HORN.
GAS OR OTHER COCK.
No. 363,639. Patented May 24, 1887.
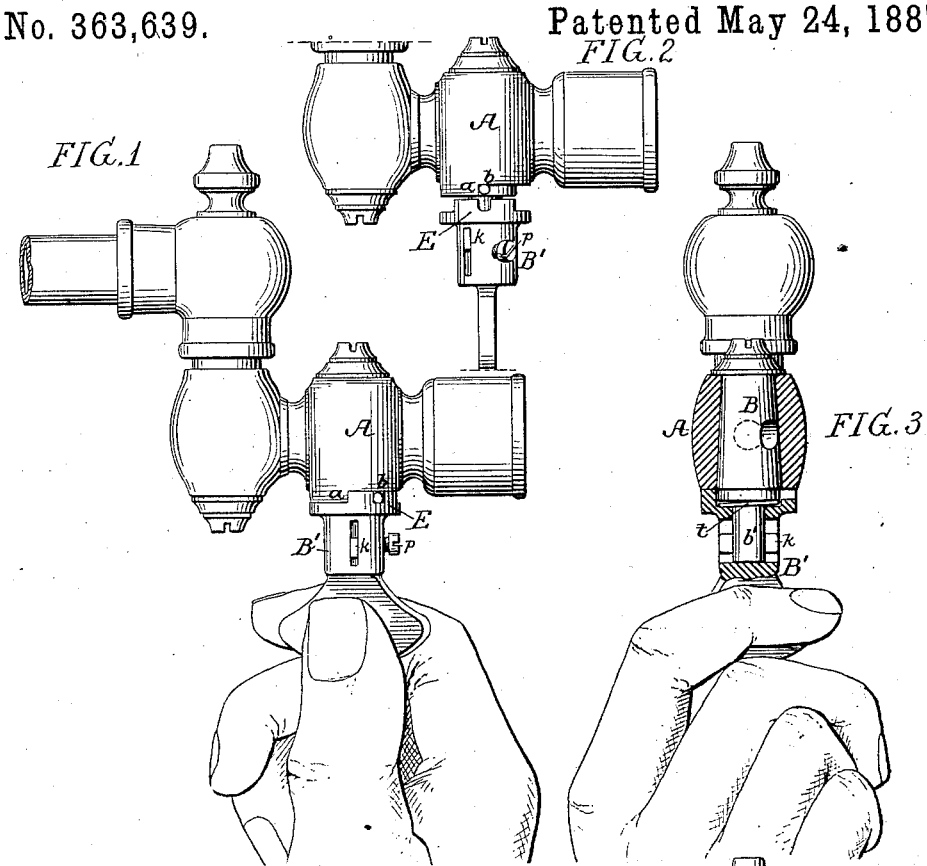
Witnesses:
John E. Parker.
William D. Conner
Inventor:
Joseph V. Horn
by his Attorneys
Howson & Son

UNITED STATES PATENT OFFICE.

JOSEPH V. HORN, OF PHILADELPHIA, PENNSYLVANIA.

GAS OR OTHER COCK.

SPECIFICATION forming part of Letters Patent No. 363,639, dated May 24, 1887.

Application filed February 1, 1887. Serial No. 226,141. (No model.)

*To all whom it may concern:*

Be it known that I, JOSEPH V. HORN, a citizen of the United States, residing in Philadelphia, Pennsylvania, have invented certain Improvements in Gas and other Cocks, of which the following is a specification.

The object of my invention is to provide a gas or other cock with an attachment whereby the flow of gas or other fluid may be partially cut off without danger of its being cut off entirely, but so that the cock may be entirely closed when desired.

My improvement is more especially applicable to gas-cocks which have frequently to be manipulated to turn the light down quite low, without, however, turning it entirely out.

In the accompanying drawings, Figure 1 is a side view of a gas-cock provided with my improvement and showing the cock turned to put the light down low, but not entirely out. Fig. 2 is a corresponding view showing the cock entirely closed. Fig. 3 is a vetical section through the cock in the position shown in Fig. 1. Fig. 4 is a perspective view of the valve and its parts detached from the body of the cock. Fig. 5 is a vertical section of a modification, and Fig. 6 is a perspective view illustrating another modification.

In the drawings I have shown my improvement as applied to one common form of gas-cock; but it should be understood that it may be applied to other styles of gas-cocks, as well as to cocks and valves for other fluids than gas.

A is the body of the cock, and B the cock proper or valve. The body of the cock is provided with the usual shoulders or stops, $a$, against which the stop-pin $b$ on the valve or its stem may come into contact when the cock is turned entirely off, as shown in Fig. 2. These parts are of any of the usual constructions. With these stops I combine a movable block, which can be interposed between the two stops $a$ and $b$, as shown in Fig. 1, so that the cock can be turned to nearly, but not quite, cut off the flow of gas, and the light consequently brought very low without danger of its being turned entirely out, no matter how quickly the cock be turned. I prefer in all cases to make this interposing block E forked, so as to embrace the stop-pin $b$ on both sides, and by that means act on either side of the stop-pin, no matter in which direction the cock be turned. In the construction shown in Figs. 1, 2, 3, and 4 I have shown this movable block E as secured to or forming part of the thumb piece or knob B' of the cock. This thumb piece or knob is made longitudinally movable to a limited extent on the stem $b'$ of the cock, the thumb piece being hollowed out for the reception of the said stem. The two may be secured together in various ways, so that they cannot turn independently of each other, while the thumb-piece, with the interposing block, can move longitudinally on the stem Figs. 1 and 2. In Figs. 1, 2, 3, and 4 I have shown a key, $k$, as secured in the stem $b'$, and passing through slots in the thumb-piece. In the construction shown in Fig. 5 I have illustrated a screw, $k$, in the thumb-piece, having its inner end playing in a slot in the stem $b'$.

If desired, a small spring, $t$, Figs. 3 and 4, may be interposed between the stem of the cock and the thumb-piece to normally press the latter downward to keep the interposing block out of action until pressed upward. A binding-screw, $p$, may be used to lock the thumb-piece to the stem in the raised position, if desired. On the other hand, a pull-spring, $t'$, may be employed, as shown in Fig. 5, with its opposite ends secured to the cock and to the movable thumb-piece, so as to normally keep the latter up with the interposing block in contact with the stop-pin $b$. Instead of making this interposing block in one with the thumb-piece and having the latter movable on the stem of the valve, the thumb-piece may be fixed to or form part of the valve, as usual, and the movable interposing block F may then be in the form of a vertical slide adapted to a groove in the thumb-piece or stem, as shown in Fig. 6, the slide being in such a position that it can be readily moved into or out of action by the finger or thumb in grasping the thumb-piece to turn the cock. In its simplest form this slide can be without any actuating-spring to tend to keep it depressed, for instance; but there should then be just sufficient friction between the slide and its groove to keep the slide in any position to which it may be moved.

I claim as my invention—

1. A gas or other cock having a stop on the body of the cock and a stop on the valve, with a movable block carried by the valve and adapted to be interposed between the said stops, as and for the purpose set forth.

2. A gas or other cock having two stops on the body of the cock and a stop on the valve, with a movable forked block to embrace the said stop on the valve, as and for the purpose set forth.

In testimony whereof I have signed my name to this specification in the presence of two subscribing witnesses.

JOSEPH V. HORN.

Witnesses:
WALTER H. BASSETT,
HARRY SMITH.